Figure 1:
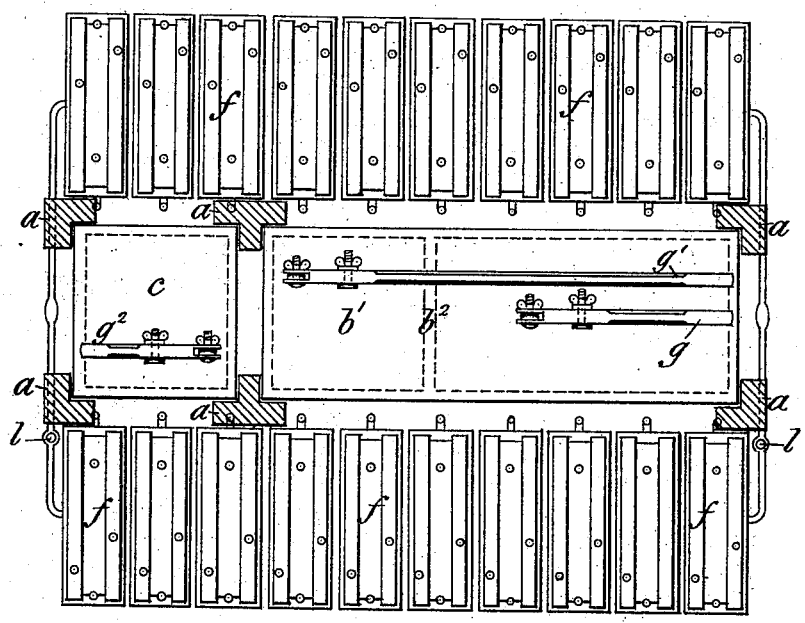

(No Model.) 3 Sheets—Sheet 1.

J. T. ARMSTRONG.
GALVANIC BATTERY.

No. 372,193. Patented Oct. 25, 1887.

Witnesses.
Percy B. Hill.
Robert Everitt.

Inventor
James T. Armstrong.
By James L. Norris
Atty.

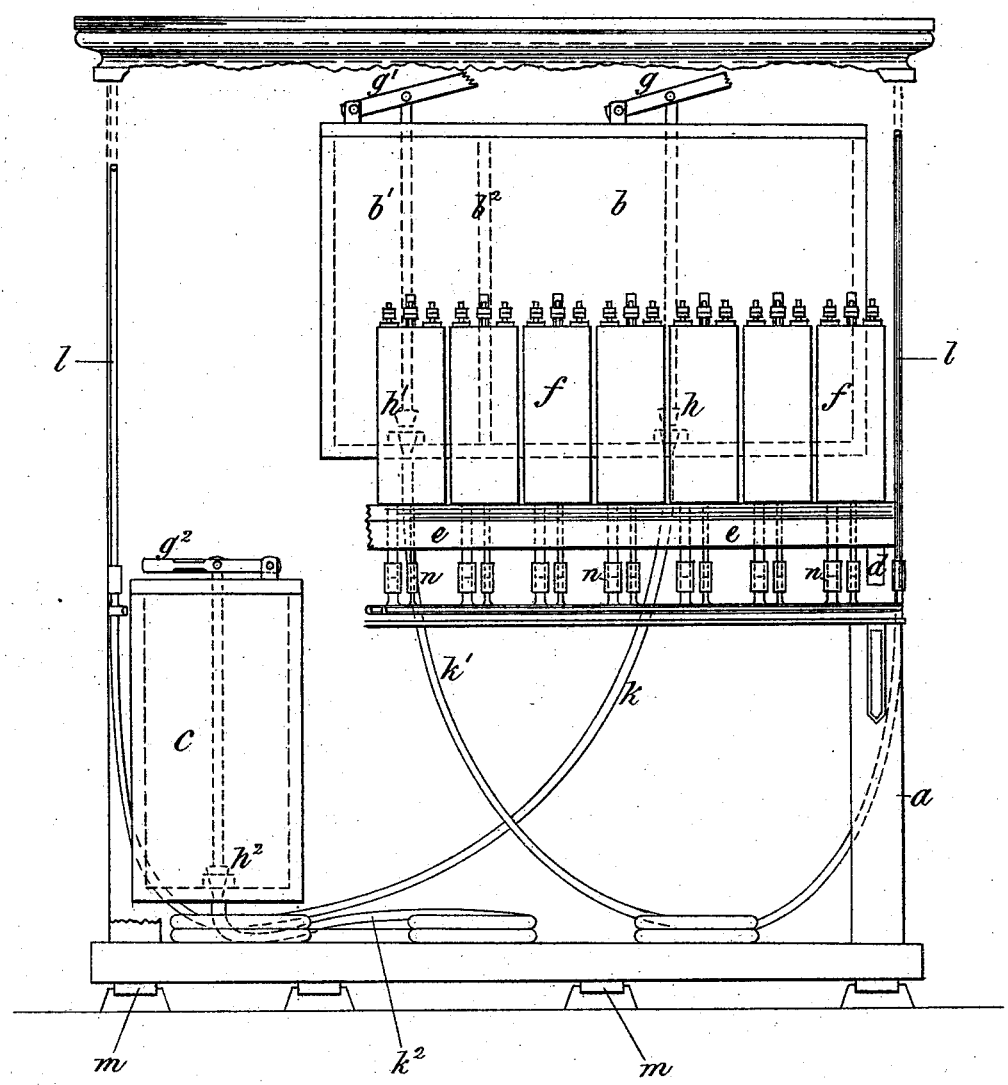

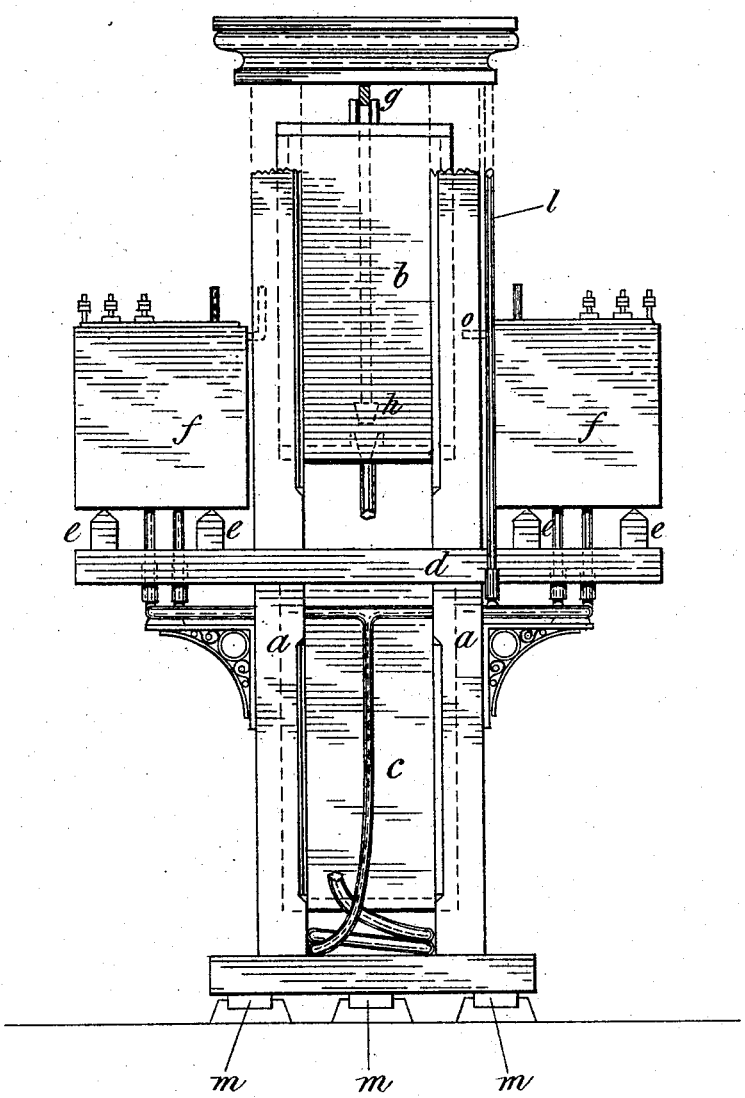

UNITED STATES PATENT OFFICE.

JAMES TARBOTTON ARMSTRONG, OF LONDON, ENGLAND.

GALVANIC BATTERY.

SPECIFICATION forming part of Letters Patent No. 372,193, dated October 25, 1887.

Application filed February 23, 1886. Serial No. 192,913. (No model.) Patented in England November 24, 1885, No. 14,382.

*To all whom it may concern:*

Be it known that I, JAMES TARBOTTON ARMSTRONG, a subject of the Queen of Great Britain, residing at 31 Aldermanbury, in the city of London, England, analytical and consulting chemist and electrician, have invented certain new and useful Improvements in and Relating to the Working of Electrical Batteries and the Fluids and Liquids Employed therein, (for which I have obtained a patent in Great Britain, No. 14,382. dated November 24, 1885,) of which the following is a specification.

It is well known that electrical batteries with clean electrodes are more effective than those which are corroded or otherwise impaired, and that when the batteries have been at work continuously for a length of time the electrodes become corroded or coated with deleterious chemical compounds, which greatly interfere with their working and lessen the electric force or current obtainable therefrom. This defect in the working of electrical batteries causes much waste of material and reduces its constancy and effectiveness.

Now, the object of my invention is to remove or remedy such defects, and thus to improve the normal working and continuity and to render the same more constant than hitherto has been practicable, and also to make use of certain mixtures in lieu of the ordinary exciting liquids for the cells in which the zinc or equivalent elements are immersed in electrical batteries.

In carrying out my invention I make use of various mixtures of fluids with fluids, and of fluids and other substances mixed therewith, and periodically exchange such mixtures for others which act upon the electrodes, so as to remove or counteract the objectionable effect of the previous mixture upon such electrodes. Thus one particular exciting or cleansing mixture may be used for a certain time. Then this mixture is withdrawn from the battery and another inserted, which will neutralize the effect of the previous mixture upon the electrodes and remove the deposit, corrosive material, or other obstruction to the proper working of the battery, and restore the electrodes to a great extent to their initial effectiveness, for which purpose I use two or more cisterns charged with the necessary fluids or mixtures, and connect and disconnect such cisterns to and from the batteries alternately, consecutively, or otherwise, as found necessary to effect such purpose, as described in my American patent of December 9, 1885, No. 340,474, but having more cisterns. In some cases the fluids consist of oils or fats, either separately or combined and saponified, or partly saponified, or having acids or alkalies assimilated with them. I also, for the same purpose, sometimes use the refuse oils from gas-works, which during such use become purified and are made more valuable than their original cost. Such refuse oils either contain acids or alkalies, and hence become useful as excitants of electricity.

In order that my said invention may be more particularly described and ascertained, reference is hereby made to the accompanying drawings, in which similar letters of reference indicate corresponding parts, and which drawings are merely illustrative of one method of working my invention, and are not intended to confine the carrying out of the invention to that one particular form and arrangement.

Figure 1 is a plan, Fig. 2 is a front elevatation, and Fig. 3 is an end elevation, of a battery arranged in accordance with my invention.

$a\,a$ are standards of T and L form, as shown in section in Fig. 1. These standards form part of the frame, and also act as guides to the cisterns $b$, $b'$, and $c$. Cross-pieces $d\,d$ carry longitudinal bearing-bars $e\,e$, upon which the batteries $f\,f$ are supported. The cisterns $b\,b'$ are made in one externally and divided by a partition, $b^2$, the cistern $c$ being quite separate from the other two.

In Fig. 2 the cisterns $b\,b'$ are shown raised nearly to the top of the framing, and the cistern $c$ is shown down. The cisterns are made capable of being raised and lowered, and are made to partially balance each other. The cisterns are lifted and lowered in accordance with my former patent, No. 340,474, the cistern $c$ having weights added thereto when necessary to enable it to counterbalance the united cisterns $b\,b'$. The relative sizes of the cisterns may be varied and are not necessarily those shown in the drawings. Communication between the cisterns and the batteries is made by means of leaden pipes $k\,k'\,k^2$, such pipes being found in practice to be sufficiently elastic for that purpose.

$g\ g'\ g^2$ are levers which carry plugs $h\ h'\ h^2$ (shown by dotted lines) for opening and closing communication with the pipes and batteries.

The pipe $k$, leading from the cistern $b$, places that cistern in communication with the outer cells of the batteries when the valve $h$ is opened by the lever $g$. In like manner the pipe $k^2$ from the cistern $c$ places such cistern $c$ also in communication with the same outer cells of the batteries when the valve $h^2$ is opened by the lever $g^2$. The cistern $b'$, by means of the pipe $k'$, is placed in communication with the central cells of the batteries in which the carbons are fitted when the valve $h'$ is opened by the lever $g'$.

When it is desired to put the batteries in action, the cistern $c$ being down and the valve $h^2$ shut, the twin cisterns $b\ b'$ being raised, the valves $h\ h'$ are opened, whereby the exciting fluids enter the cells and operate upon the plates and carbons. The height of the cisterns is regulated to suit the power required, gage-glasses $l\ l'$ being fitted in order that the height of the fluids in the cells may be rendered visible. When it is desired to cease working, the cisterns $b\ b'$ are lowered, with the valves $h\ h'$ still open, whereby the fluids are withdrawn from the batteries and returned to the cisterns $b\ b'$. The valves $h\ h'$ are then closed. The valve $h^2$ of the cistern $c$ may then be opened, if necessary, in order that the operation of cleansing the zinc plates may take place.

$o$ is an overflow pipe to prevent the batteries being inadvertently filled to the top.

One example of charging the cisterns is as follows: The cistern $b$ may be charged with palm-oil saponified with potash or soda, and palm or crude tar oils, also saponified, or also with a small quantity of acid and oil. In places where it is found to be inconvenient to gather the oils and fats or their resultant compounds, I make use of salt and water or any other suitable mixture or material. Cistern $b'$ may be charged with ordinary acid mixtures, and cistern $c$ may be charged with a mixture of eight parts water and one part sulphuric acid, which mixture is usually capable of cleansing the zinc in a few seconds.

When the cistern $c$ has been lowered and has received its fluid back from the cells after cleansing the zinc, crystals are gradually formed in such cistern while at rest, which crystals deposit themselves therein, and such crystals consist of substances useful in commerce and possessing marketable value, the process being automatic and inexpensive and tending not only to put the battery in a better working condition, but also to recoup the expense incurred in producing the electric current from the batteries.

The whole of the apparatus rests on blocks $m\ m$, of insulating material.

The pipes from the cells to the mains are conveniently united by short rubber junctions $n\ n$, which junctions facilitate the removal of cells or batteries when required, as described in my said previous patent, No. 340,474.

By the foregoing method of working I obtain better and more lasting results and greatly promote economy in the production of electricity and electrical power.

I do not in the present application claim the combination of battery-cells, electrolyte supply-tubes connected therewith, vertically-movable supply-cisterns, and a stationary feeding-cistern and a movable cleansing-cistern, since such devices are embodied in and claimed in an application for patent filed by me on the 1st day of September, 1887, No. 248,534.

I claim—

1. The herein-described method of working galvanic batteries, which consists in first immersing the electrodes in one exciting fluid or mixture, then withdrawing said fluid or mixture and admitting into the same electrode chamber or battery cell another exciting fluid or mixture, which will neutralize the objectionable effects of the antecedent fluid, cleanse the electrodes, and restore the same to more effective working, substantially as herein set forth.

2. In a galvanic battery, an electrolyte or exciting fluid consisting of saponified oils or fats, substantially as herein set forth.

3. In a galvanic battery, an electrolyte or exciting fluid consisting of oils or fats having an alkali or acid incorporated therewith, substantially as herein set forth.

4. The within method of operating electrical batteries, which consists in supplying one cell of the battery with a mixture of saponified oils or fats and another cell with an acid mixture, and subsequently withdrawing the mixtures from the cells and charging the cells which contained the oils or fats with a mixture of water and sulphuric acid and afterward withdrawing said last mixture, substantially as and for the purposes described.

5. The combination of the battery-cells, rising and falling cisterns $b$ and $b'$, communicating therewith, valves to said cisterns for controlling the flow of the exciting fluid to the cells, and a valve-controlled cistern, $c$, communicating with one of the cells of the battery, substantially as and for the purpose described.

In testimony whereof I have hereunto set my hand this 5th day of February, 1886.

JAMES TARBOTTON ARMSTRONG.

Witnesses:
THOMAS MOY,
*Of 8 Quality Court, London, Civil Engineer.*
HERBERT E. DALE,
*Of 17 Gracechurch Street, London, Notary's Clerk.*